United States Patent
Leterc et al.

(10) Patent No.: US 10,556,375 B2
(45) Date of Patent: Feb. 11, 2020

(54) MOULD BASE PROVIDED WITH DECOMPRESSION CHANNELS OPENING ON TO A PERIPHERAL UPPER FACE

(71) Applicant: SIDEL PARTICIPATIONS, Octeville-sur-Mer (FR)

(72) Inventors: François Leterc, Octeville-sur-Mer (FR); Laurent Penet, Octeville-sur-Mer (FR)

(73) Assignee: SIDEL PARTICIPATIONS, Octeville-sur-Mer (FR)

( * ) Notice: Subject to any disclaimer, the term of this patent is extended or adjusted under 35 U.S.C. 154(b) by 0 days.

(21) Appl. No.: 16/336,255

(22) PCT Filed: Sep. 21, 2017

(86) PCT No.: PCT/FR2017/052527
§ 371 (c)(1),
(2) Date: Mar. 25, 2019

(87) PCT Pub. No.: WO2018/055292
PCT Pub. Date: Mar. 29, 2018

(65) Prior Publication Data
US 2019/0210266 A1 Jul. 11, 2019

(30) Foreign Application Priority Data

Sep. 23, 2016 (FR) ...................................... 16 58942

(51) Int. Cl.
*B29C 49/48* (2006.01)
*B29C 49/62* (2006.01)
(Continued)

(52) U.S. Cl.
CPC .............. *B29C 49/48* (2013.01); *B29C 49/06* (2013.01); *B29C 49/62* (2013.01);
(Continued)

(58) Field of Classification Search
CPC ........................ B29C 49/62; B29C 2049/4892
See application file for complete search history.

(56) References Cited

U.S. PATENT DOCUMENTS

| | | |
|---|---|---|
| 2008/0283533 A1 | 11/2008 | Tilton |
| 2015/0061196 A1 | 3/2015 | Dachs et al. |
| 2016/0332356 A1 | 11/2016 | Langlois et al. |

FOREIGN PATENT DOCUMENTS

| | | |
|---|---|---|
| EP | 2 845 716 A1 | 3/2015 |
| WO | 2015/092213 A1 | 6/2015 |

(Continued)

OTHER PUBLICATIONS

Rosato et al, Blow Molding Handbook, 1989, Oxford University Press, p. 529. (Year: 1989).*

(Continued)

*Primary Examiner* — Robert B Davis

(57) ABSTRACT

Mold base including a base wall and a peripheral side wall which is connected to the base wall by a fillet, this mould base ending with a peripheral upper edge and including ribs forming cavities for grooves for strengthening the base of a container to be formed and which each straddle the fillet, this mould base also including decompression vents hollowed out of the moulding face and which include, for each rib, at least one pair of shallow side channels which extend on either side of the rib and open, at an upper end, on to the peripheral upper edge.

16 Claims, 4 Drawing Sheets

(51) Int. Cl.
  *B29C 49/06* (2006.01)
  *B29L 31/00* (2006.01)
(52) U.S. Cl.
  CPC .............................. *B29C 2049/483* (2013.01);
    *B29C 2049/4892* (2013.01); *B29C 2049/4897*
    (2013.01); *B29C 2049/622* (2013.01); *B29L*
    *2031/7158* (2013.01)

(56) References Cited

FOREIGN PATENT DOCUMENTS

WO  WO-2015092259 A1 *  6/2015  ............. B29C 49/48
WO     2016/135668 A1    9/2016

OTHER PUBLICATIONS

International Search Report, dated Dec. 8, 2017, from corresponding PCT/FR2017/052527 application.

* cited by examiner

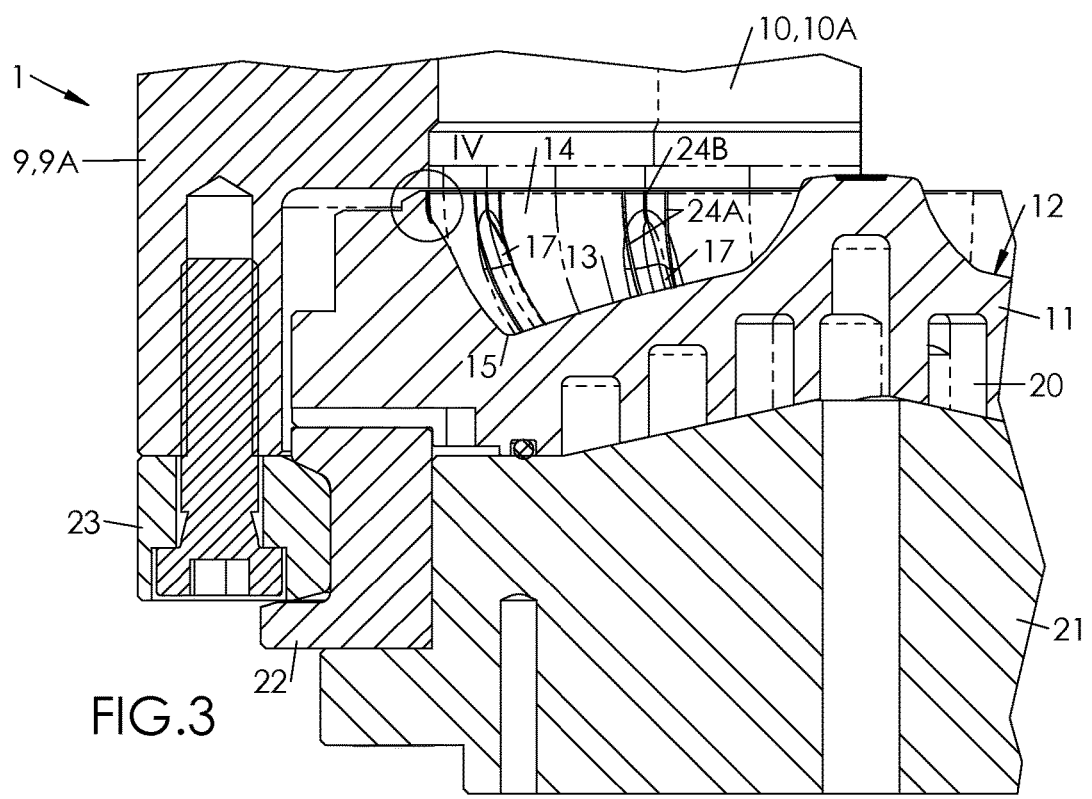
FIG.3
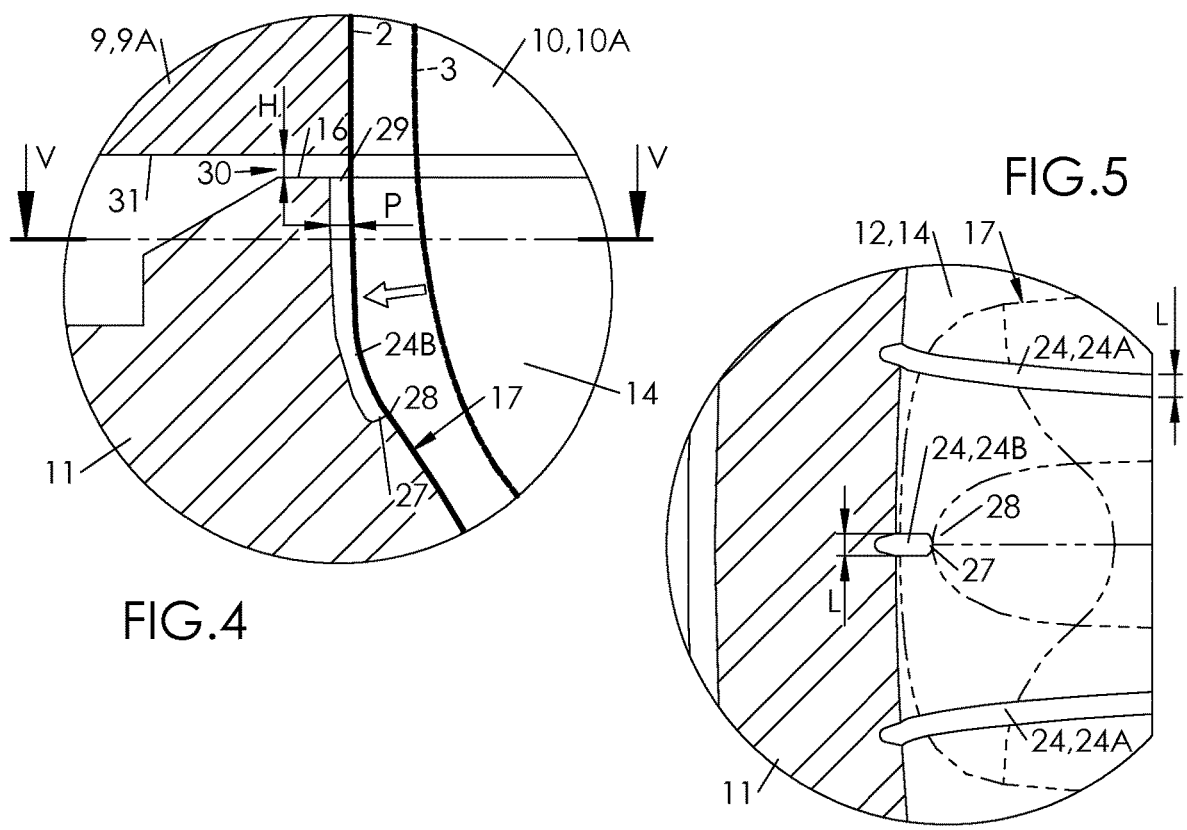
FIG.4
FIG.5

MOULD BASE PROVIDED WITH DECOMPRESSION CHANNELS OPENING ON TO A PERIPHERAL UPPER FACE

The invention relates to the forming of containers from blanks made of plastic material (and more specifically made of polyolefin) by blow molding or stretch blow molding in a mold bearing the impression of a model of the container that is to be formed. The term "blank" refers not only to a preform (ordinarily obtained by injection), but also an intermediate container that has undergone an operation prior to blow molding starting from a preform.

A mold ordinarily comprises a mold wall, bearing the at least partial impression of a body of the container, and a mold base positioned at a lower end of the mold wall and that, bearing the at least partial impression of a container base, will thus complete the mold wall. The mold wall is ordinarily divided into two half-molds that are articulated with one another to make it possible to insert the blank into the mold and to evacuate the container that is formed from the latter.

The mold base is generally pierced by one or more decompression vents that make it possible to evacuate the air that was just trapped between the material of the blank and the mold base during the blow molding.

The published international application WO 2015/092213 (Sidel Participations) proposes a one-piece mold base that includes decompression vents in the form of slots that are made in any thickness of the base. Slots are preferable to the single holes because they offer a greater flow rate. This configuration, however, is reserved for bases formed by additive manufacturing, so as not to interfere with the pipes for circulating a coolant designed to ensure thermal regulation (at low or high temperature, as required).

This configuration cannot be easily transposed to the bases manufactured by machining (i.e., by removal of material), and the need persists to propose other solutions that make it possible to increase the evacuation flow rate without interfering with the coolant circulation pipes.

For this purpose, there is proposed in the first place a mold base that is designed to equip a mold for the manufacturing of a container by blow molding or stretch blow molding starting from a polyolefin blank, with the container comprising a body and a base, with this mold base comprising a raised molding face that defines a base wall and a peripheral side wall that extends into the extension of the base wall and that is connected to the latter by a fillet that forms an impression for a plane of installation of the container, with this mold base ending, opposite the base wall, by a peripheral upper edge, this mold base including ribs forming impressions for reinforcing grooves of the base of the container and that straddle the fillet, this mold base also comprising decompression vents that are hollowed out in the molding face, the decompression vents comprising, for each rib, at least one pair of shallow side channels that extend on either side of the rib and that open, at one upper end, onto the peripheral upper edge.

In this way, the air that is trapped and then compressed between the blank and the mold base circulates in the channels and is evacuated via the peripheral upper edge. The result is an increased evacuated air flow in relation to, in particular, vents made in the form of single holes.

Various additional characteristics can be provided, by themselves or in combination. Thus:

Each side channel has, for example, a lower end located at the fillet;

The decompression vents comprise, for example, for each rib, at least one central channel that extends into the extension of the rib and extends from a lower end located at a vertex of the rib up to an upper end via which the central channel opens onto the peripheral upper edge;

Each channel extends, for example, into a depth that is less than or equal to $5/10$ mm, and, for example, approximately $3/10$ mm;

Each channel has, for example, a width that is smaller than or equal to $5/10$ mm, and, for example, approximately $3/10$ mm;

The side channels can, at their lower ends, be divergent or convergent;

According to an embodiment, each rib comprises a vertical portion that extends over the peripheral side wall and a horizontal portion that extends over the base wall, and for each rib, the side channels extend on either side of the vertical portion.

In the second place, a mold is proposed for the manufacturing of containers from polyolefin blanks, which comprises a mold wall that defines a cavity bearing the at least partial impression of a body of the container and a mold base, as presented above, bearing the at least partial impression of a container base and that extends into the extension of the mold wall.

A gap is advantageously made between a lower end face of the mold wall that borders the cavity and the peripheral upper edge of the mold base. This gap is used to evacuate the air that is drained though the channels.

This gap preferably has a height that is less than or equal to $5/10$ mm.

In the third place, a method for manufacturing a container by blow molding or by stretch blow molding in a mold as presented above, which comprises an operation for insertion of a blank (advantageously made of polyolefin) into the mold and an operation for injection of a pressurized fluid into the blank, is proposed.

Other objects and advantages of the invention will emerge upon reading the description of an embodiment, given below with reference to the accompanying drawings in which:

FIG. 3 is a partial cutaway view along the plane III traced in FIG. 2;

FIG. 4 is a detail view on an enlarged scale that is in the inset IV of FIG. 3;

FIG. 5 is a detail cutaway view along the plane V-V traced in FIG. 4;

Figure 1:
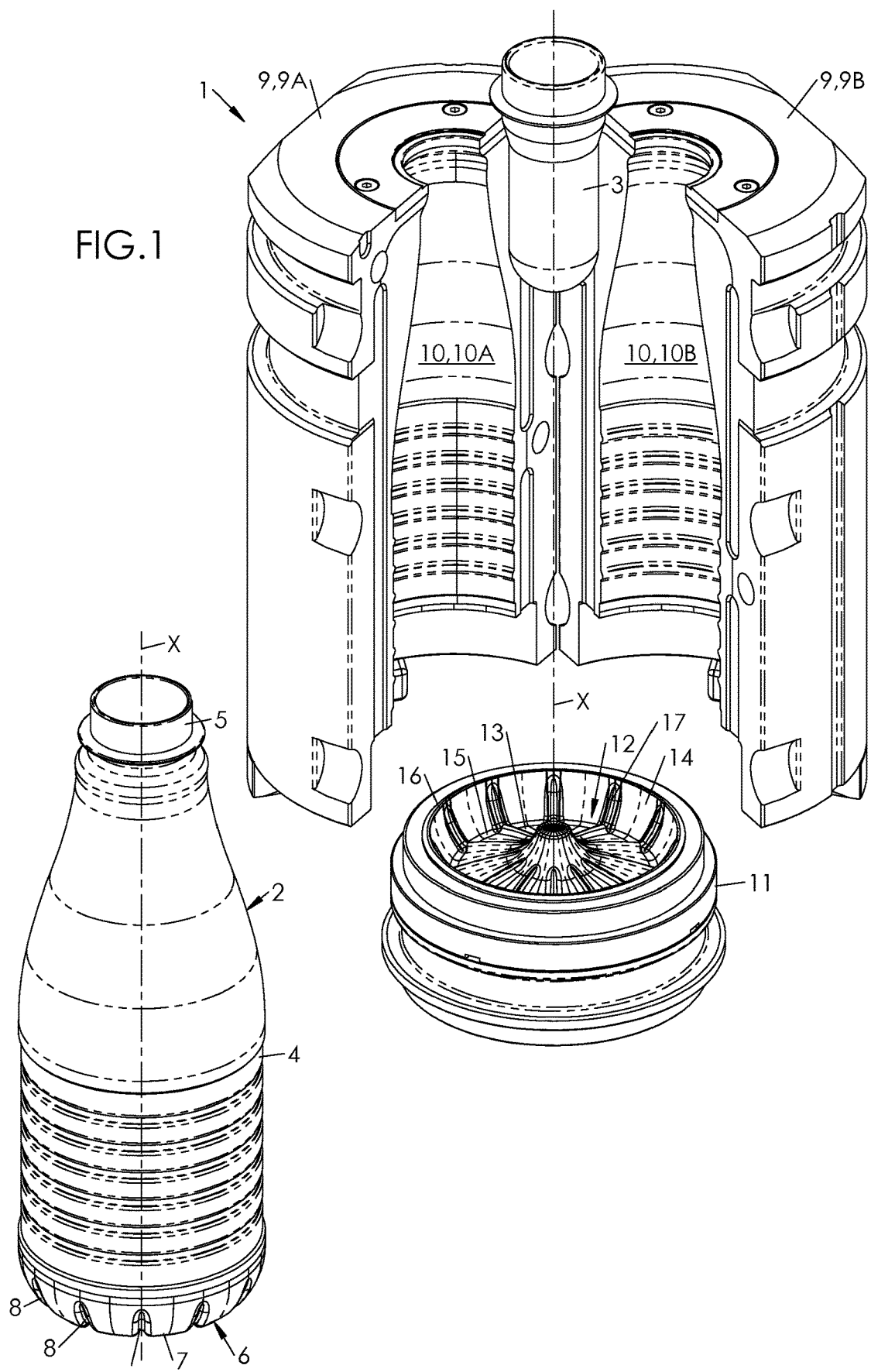
FIG. 1 is an exploded perspective view showing a mold and a container obtained from forming by blow molding or stretch blow molding in this mold starting from a polyolefin blank.

FIG. 1 shows a mold 1 for the forming of a container 2 from a polyolefin blank 3 (for example, polyethylene, polypropylene), by blow molding or stretch blow molding.

The blank 3 can be a preform that is obtained by injection of polyolefin. It can also involve an intermediate container that is obtained during a first blow-molding operation starting from a polyolefin preform.

The polyolefins are very malleable because of their low glass transition temperature and their modest melting point (generally from 85° C. to 140° C. according to their formulation).

In a known way, the container 2 comprises a body 4 with an essentially cylindrical shape, a neck 5 that extends at one upper end of the body 4 and by which the container 2 is designed to be filled and emptied, and a base 6 that closes the body 4 at a lower end of the latter. A collar is located at the junction between the neck 5 and the body 4. The neck and the collar are formed during the injection of the blank.

The base 6 of the container is connected to the body 4 by a fillet that forms a plane 7 of installation for the container 2. As shown in FIG. 1, the base 6 of the container 2 is provided with reinforcing grooves 8 that straddle the plane 7 of installation (therefore the fillet) and whose function is to stiffen its base 6 at its junction with the body 4 to prevent the axial or lateral sagging of the container 2.

In the first place, the mold 1 comprises a mold wall 9 defining a cavity 10 that bears the at least partial impression of the body 4 of the container. The mold wall 9 is advantageously made of a metal material, for example steel or aluminum, with these materials optionally being alloyed in order to increase their mechanical performances and/or their resistance to corrosion.

In the example illustrated in FIG. 1, the mold wall 9 comprises two half-molds 9A, 9B that are articulated with one another around a vertical axis to make possible the insertion of the blank 3 and the evacuation of the container 2. Each half-mold 9A, 9B has on the inside a lateral molding face 10A, 10B with the partial impression of the body 4 of the container 2 and that extends along a main axis X corresponding to an axis of overall symmetry (and not necessarily an axis of rotation) of the container 2.

Figure 2:
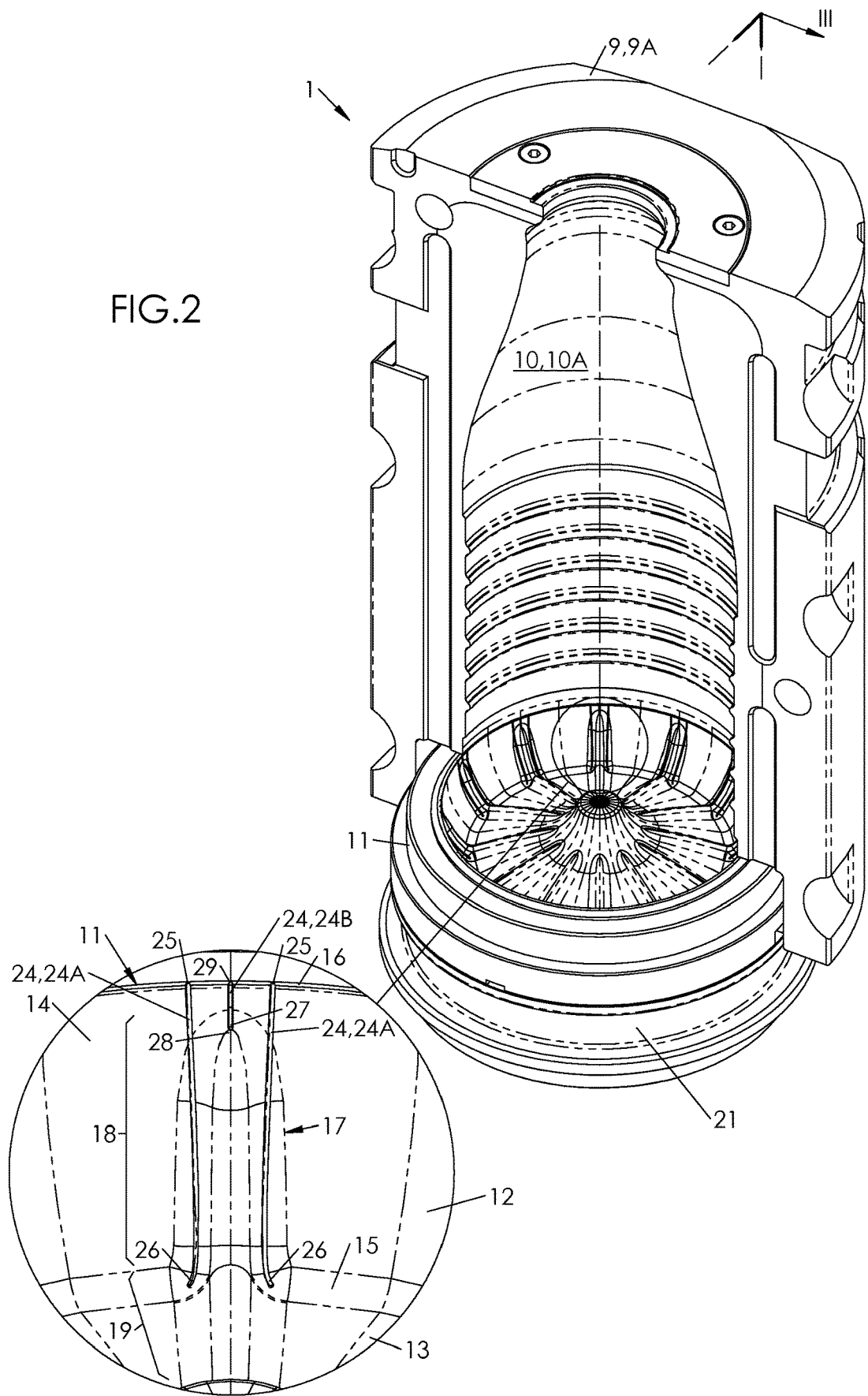
FIG. 2 is a partial perspective view of the mold of FIG. 1, shown assembled, according to a first embodiment, with, in an inset, a detail of the mold base on an enlarged scale.
Figure 6:
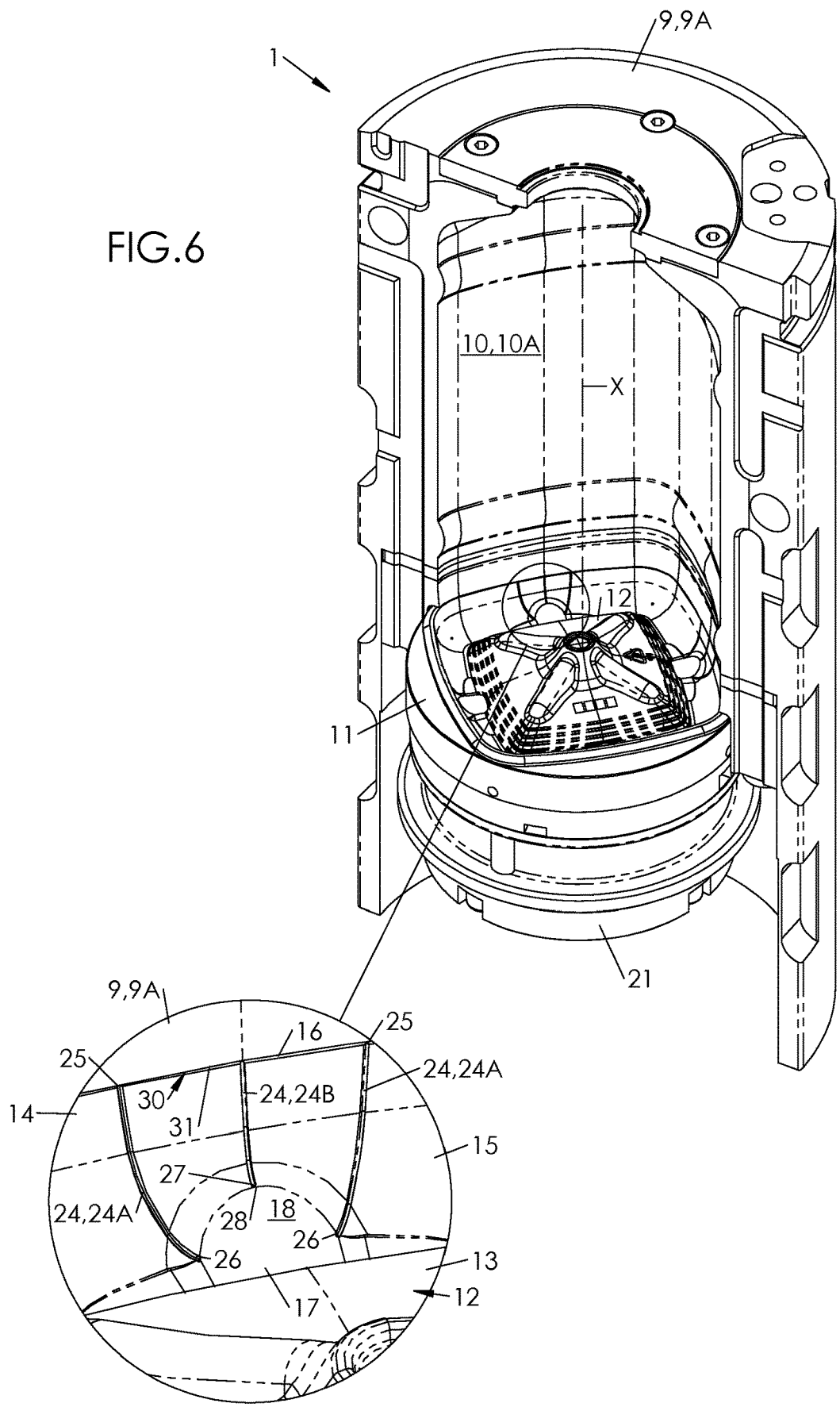
FIG. 6 is a view that is similar to FIG. 2, showing a mold according to a second embodiment.

With the half-molds 9A, 9B being identical, the same numerical references are used interchangeably for each hereinafter. In FIG. 2 and FIG. 6, for the sake of clarity, only a half-mold 9A is shown.

In the second place, the mold 1 comprises a mold base 11 that bears the at least partial impression of the base 6 of the container 2 and that extends into the extension of the mold wall 9.

More specifically, the mold base 11 comprises a raised molding face 12, bearing the at least partial impression of the base 6 of the container 2.

The molding face 12 defines a base wall 13 and a peripheral side wall 14 that extends into the extension of the base wall 13.

The base wall 13 extends transversely or essentially transversely (i.e., perpendicular or essentially perpendicular in relation to the main axis X). At its center, and as in the illustrated example, the base wall 13 can have an axial projection designed to form a central pin on the base 6 of the container 2, in the direction of the interior of the latter.

The peripheral side wall 14 connects to the base wall 13 by a fillet 15 that forms an impression for the plane 7 of installation of the container 2.

The radius of the fillet 15 is advantageously between 5/10 mm and 5 mm.

The mold base 11 ends, opposite the base wall 13, by a peripheral upper edge 16, which, in the embodiment of FIG. 2, has an annular contour (i.e., circular or essentially circular) and which, in the embodiment of FIG. 6, has a square or rectangular contour (or essentially square or rectangular).

As shown in FIG. 2 and FIG. 6, the mold base 11 includes ribs 17 that form impressions for the reinforcing grooves 8 of the base 6 of the container 2. Each rib 17 straddles the fillet 15.

According to an embodiment illustrated in FIG. 2, each rib 17 comprises a vertical portion 18 that extends over the peripheral side wall 14 and a horizontal portion 19 that extends over the base wall 13.

In the example of FIG. 6, each rib 17 extends essentially horizontally to the base wall 13.

In the example of FIG. 2, the ribs 17 are twelve in number. In the example of FIG. 6, the ribs 17 are four in number. These numbers are provided by way of examples and are not limiting.

Like the mold wall 9, the mold base 11 is advantageously made in a metal material, for example steel or aluminum, with these materials optionally being alloyed to increase their mechanical performance and/or their resistance to corrosion.

Thus, as shown in FIG. 3, the mold base 11 is advantageously provided with a pipe 20 for the circulation of a coolant that makes it possible to carry out thermal regulation of the mold base 11 and more specifically of the molding face 12. The pipe 20 is optimized to allow an effective cooling of the polyolefin that comprises the container 2. The mold base 11 is furthermore, as illustrated, mounted on a stand 21 that closes the pipe 20 and that carries, laterally, one or more centering and wear rings 22, which are designed to work with one (or more) complementary segment(s) 23, integral with the mold wall 9.

The mold base 11 comprises decompression vents 24 that are hollowed out in the molding face to allow the evacuation of air trapped between the blank 3 in the process of forming and the molding face 12.

These decompression vents 24 comprise, for each rib 17, at least one pair of shallow side channels 24A that extend on either side of the rib 17 and open, at an upper end 25, onto the peripheral upper edge 16.

In the example of FIG. 2, the side channels 24A extend on either side of the vertical portion 18 of the rib 17. More specifically, the side channels 24A border the vertical portion 18 of the rib 17.

These side channels 24A considerably improve, by comparison with vents in the form of holes, the impression-taking of the base 6 of the container, in particular at its reinforcing grooves 8, thanks to a drainage and an evacuation that are more effective from the air trapped between the blank 3 and the mold base 11, in particular when the blank 3 comes into contact with the latter.

According to a preferred embodiment, each side channel 24A has a lower end 26 that is located at the fillet 15.

Tests have shown that this configuration also improves the impression-taking on the side edges of each rib 17.

Also according to a preferred embodiment, the decompression vents 24 also comprise, for each rib 17, at least one central channel 24B that is also of shallow depth and that extends into the extension of the rib (and more specifically, in the example of FIG. 2, of the vertical portion 18 of the latter) and extends from one lower end 27 located at a vertex 28 of the rib 17, up to an upper end 29 by which the central channel 24B opens onto the peripheral upper edge 16.

This central channel 24B improves the impression-taking of the groove 8 at the vertex of the latter. Combined with the side channels 24A, the central channel 24B makes possible a perfect impression-taking of the groove 8 in its entirety.

The expression "shallow depth" means that this depth (measured according to the local normal to the face in which a vent 24—i.e., a channel 24A and, if necessary, a channel 24B—is hollowed out) is insignificant with respect to the radius (i.e., the half-diameter, or the half-width width, overall) of the mold base 11. In practice, a depth that is less than or equal to 1 mm can be considered "shallow." Beyond this value, and according to the width of the vent 24, the material runs the risk of flowing into the latter and of forming undesirable beads on the container 2.

More specifically, each vent 24 (channel 24A, and, if necessary, channel 24B) advantageously extends over a depth P that is less than or equal to 5/10 mm, and, for example, approximately 3/10 mm.

Furthermore, each vent 24 advantageously has a width L that is less than or equal to 5/10 mm, and, for example, approximately 3/10 mm.

Combined, these sizing values offer a good compromise between the impression-taking and the minimization of traces (beads) on the container 2.

In the example that is illustrated in FIG. 2, where the container 2 (and with it, the mold base 11) is essentially symmetrical in rotation around its X axis, the side channels 24A are divergent at their lower ends 26 (i.e., in the illustrated example, at the fillet 15). This configuration promotes the evacuation of possible air pockets located at junctions between the ribs 17 and the fillet 15.

In the example that is illustrated in FIG. 6, where the impression of the container 2 is axisymmetric but with a polygonal cross-section (here, rectangular or square), and where the radius of the fillet 15 is essentially larger than in the example of FIG. 2, the side channels 24A are, in contrast, convergent at their lower ends 26.

As FIG. 4 clearly shows, in the closed position of the mold 1, a gap 30 is advantageously made between a lower end face 31 of the mold wall 9 that borders the cavity 10 and the peripheral upper edge 16 of the mold base 11. In this way, the evacuation of the air coming from the channels 24A (and, if necessary, 24B) can be done in the radial direction, in this gap 30 between the mold wall 9 and the mold base 11. This gap 30 has a height H that is preferably less than or equal to 5/10 mm, and, for example, approximately 3/10 mm. These values are particularly effective, in the case of a polyolefin container 2, to ensure proper evacuation of air, while limiting the risk that the material flows between the mold wall 9 and the mold base 11, which would create an unattractive bead over the entire periphery of the container 2.

To manufacture a container 2 from a blank (advantageously made of polyolefin), the procedure is as follows.

The first step is to close the mold 1 on the blank 3 by folding back the half-molds 9A, 9B on one another, thus trapping the mold base 11 that becomes both centered and positioned vertically in the extension of the mold wall 9, as illustrated in FIG. 3.

With the mold 1 being closed, the blank 3 is suspended by means of its collar in the cavity 10 that is defined by the mold 1.

Next, a pressurized fluid is injected into the blank 3. Simultaneously, it is possible to stretch the blank 3 by means of a sliding rod that pushes back the material in the direction of the mold base 11, in such a way, in particular, as to ensure its centering and therefore to guarantee a good distribution of the material.

During the forming, and as represented by the arrow in FIG. 4, the material of the blank 3 becomes deformed and occupies various intermediate configurations (one of which is illustrated in dotted lines in FIG. 4) before becoming flattened against the mold 1 (as illustrated in solid bold lines in FIG. 4).

The air that is trapped between the material of the blank 3 (and then of the container 2) and the mold base 11 is evacuated via the channels 24A and, if necessary, the channels 24B, which guide the air upward, and more specifically toward their upper ends 25, 29 that open onto the peripheral upper edge 16, from where the air is then evacuated laterally via the gap 30 that is made between the mold wall 9 and the mold base 11.

In the final container 2, the marks that are due to the channels 24A, 24B are imperceptible despite the malleable nature of the material that is used.

This mold structure consequently makes it possible to form effectively a container 2 in a malleable material, and in particular to form with a better impression-taking the grooves 8 that impart good mechanical strength to the container 2.

The invention claimed is:

1. Mold base (11) to equip a mold (1) for the manufacturing of a container (2) by blow molding or stretch blow molding starting from a polyolefin blank, with the container (2) comprising a body (4) and a base (6), the mold base (11) comprising:
    a raised molding face (12) that defines a base wall (13) and a peripheral side wall (14) that extends into the extension of the base wall (13) and that is connected to the latter by a fillet (15) that forms an impression for a plane (7) of installation of the container (2), with this mold base (11) ending, opposite the base wall (13), by a peripheral upper edge (16),
    ribs (17) forming impressions for reinforcing grooves (8) of the base (6) of the container (2) and that straddle the fillet (15), and
    decompression vents (24) that are hollowed out in the molding face (12), wherein the decompression vents (24) comprise, for each rib (17):
        at least one pair of shallow side channels (24A) that extend on either side of the rib (17) and that open, at one upper end (25), onto the peripheral upper edge (16), and
        at least one central channel (24B) that extends into the extension of the rib (17) and extends from one lower end (27) located at a vertex (28) of the rib (17)up to an upper end (29) by which the central channel (24B) opens onto the peripheral upper edge (16).

2. Mold base (11) according to claim 1, wherein each side channel (24A) has a lower end (26) that is located at the fillet (15).

3. Mold base (11) according to claim 1, wherein each channel (24A, 24B) extends to a depth (P) that is less than or equal to 5/10 mm.

4. Mold base (11) according to claim 3, wherein the depth (P) of each channel (24A, 24B) is approximately 3/10 mm.

5. Mold base (11) according to claim 1, wherein each channel (24A, 24B) has a width (L) that is less than or equal to 5/10 mm.

6. Mold base (11) according to claim 5, wherein the width (L) of each channel (24A, 24B) is approximately 3/10 mm.

7. Mold base (11) according to claim 1, wherein the side channels (24A) are divergent at their lower ends (26).

8. Mold base (11) according to claim 1, wherein the side channels (24A) are convergent at their lower ends (26).

9. Mold base (11) according to claim 1, wherein each rib (17) comprises a vertical portion (18) that extends over the peripheral lateral wall (14) and a horizontal portion (19) that extends over the base wall (13), and wherein the side channels (24A) extend on either side of the vertical portion (18) for each rib.

10. Mold (1) for the manufacturing of containers (2) starting from polyolefin blanks, which comprises a mold base (9) defining a cavity (10) bearing the at least partial impression of a body (4) of the container (2) and a mold base (11) according to claim 1, bearing the at least partial impression of a base (6) of the container (2) and that extends into the extension of the mold wall (9).

11. Mold (1) according to claim 10, wherein a gap (30) is made between a lower end face (31) of the mold wall (9) that borders the cavity (10) and the peripheral upper edge (16) of the mold base (11).

12. Mold (1) according to claim 11, wherein the gap (30) has a height (H) that is less than or equal to 5/10 mm.

13. Method for manufacturing a container by blow molding or stretch blow molding in a mold according to claim 10, which comprises an operation tor inserting a blank into the mold and an operation for injecting a pressurized fluid into the blank.

14. Method according to claim 13, wherein the blank is manufactured in a polyolefin.

15. Mold base according to claim 2, wherein each channel extends to a depth that is less than or equal to 5/10 mm.

16. Mold base according to claim 2, wherein each channel has a width that is less than or equal to 5/10 mm.

* * * * *